Oct. 26, 1937.       F. WASSERBÄCH       2,097,169
COTTER PIN
Filed Aug. 24, 1936
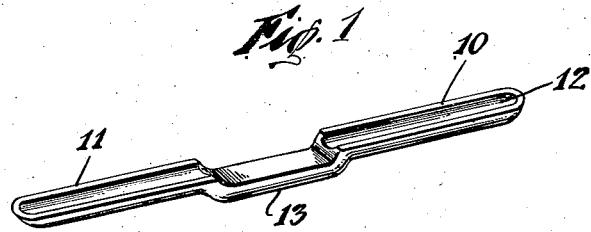
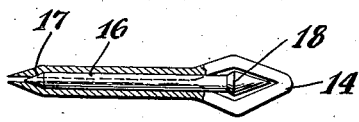
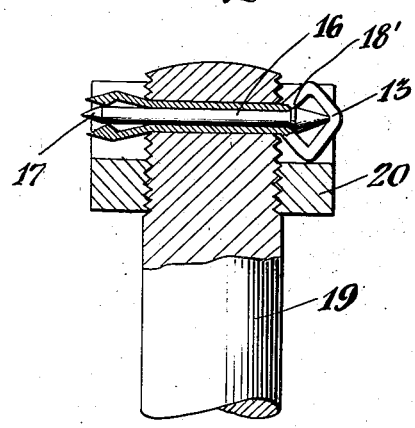
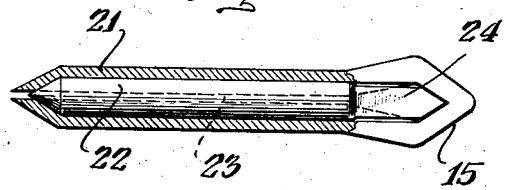
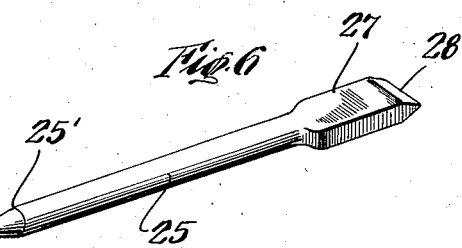
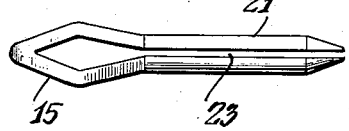
INVENTOR
Franz Wasserbach
BY
ATTORNEY Patented Oct. 26, 1937

2,097,169

UNITED STATES PATENT OFFICE 2,097,169

COTTER PIN

Franz Wasserbäch, Yonkers, N. Y.

Application August 24, 1936, Serial No. 97,508

2 Claims. (Cl. 85—8.5)

This invention relates to improvements in cotter pins, and it is the principal object of my invention to provide a cotter pin which is equipped with means to ensure a positively acting double lock for locking two members or elements firmly in their adjusted relative positions as for instance a nut and bolt, a wheel on its shaft, or the like, so as to prevent the connection from becoming loose under the influence of constant vibrations to which these parts may be subjected and thus prevent loss of any of these parts.

A further object of my invention is the provision of a cotter pin having resilient arms or branches connected by a head and formed from a channeled blank, the head having any suitable shape and form while the cotter pin is suitably formed to receive and hold an inner locking pin, which, when driven home through an opening in one of the members to be united by a blow with for instance a hammer upon its head, will spread the free ends of the cotter pin arms and also spread the head to firmly engage the pin and thus provide an absolutely secure and positively acting lock.

A still further object of my invention is the provision of a cotter pin having heads of various suitable shapes and forms and equipped with locking pins accommodated to the respective head shapes.

Another object of my invention is the provision of a cotter pin of comparatively simple and inexpensive construction, yet durable and highly efficient in use.

These and other objects and advantages of my invention will become more fully known as the description thereof proceeds, and will then be specifically defined in the appended claims.

In the accompanying drawing forming a material part of this disclosure:

Fig. 1 is a perspective view of a blank from which a cotter pin constructed according to my invention is formed.

Fig. 2 is a detail view of the inner locking pin used with my improved cotter pin.

Fig. 3 illustrates in side elevation, partly in section a cotter pin according to my invention before its use.

Fig. 4 shows a bolt and nut connection partly in section with a cotter pin according to my invention in its locking position.

Fig. 5 illustrates, partly in section, a modified form of cotter pin.

Fig. 6 shows a modified form of locking pin.

Figs. 7 and 8 are detail views.

As illustrated the blank from which my cotter pin is formed comprises two branches 10, 11 suitably channeled, as at 12, and both connected by a head 13 integrally made therewith. This head may have various shapes or forms as for instance shown at 14 in Figure 3 or at 15 in Figure 5. A locking pin 16 is embedded in the channels of the branches of the cotter pin and has one of its ends pointed to form a shoulder 17 and its opposite end conically shaped, as at 18 to engage in the head of the cotter pin when the same is for instance passed through a bore in a bolt 19 and engaged with a lock-nut 20. The shoulder 17 is adapted to engage the inner faces of the cotter pin proper to spread the same when the head 13 is substantially flattened by means of a blow by a hammer or similar suitable tool to firmly engage the conical head of the locking pin within the head 13 of the cotter pin to hold the same in place at this point.

In the form of my invention illustrated in Figure 5, the cotter pin 21 has a somewhat elongated head 15, and the locking pin 22 is hollow and has inserted therein a pin 23 having a flattened head 24.

In the form of locking pin illustrated in Figure 6 the pin 25 has also at one end a shoulder 25' ending in a point 26, while the other end is flattened, as at 27 and provided with the bevelled end 28.

In use the blank 10 is folded upon itself at the centrally located head 13 and the locking pin 16 is inserted between the branches 10, 11 in the channels thereof so that its shouldered part 17, when the cotter pin is driven home by a blow of a hammer or like tool, will spread the outer ends of the branches 10, 11 while the head 13 of the cotter pin will be somewhat flattened or extended, as for instance indicated in Figure 4 and will positively engage the end of the locking pin which then will be securely pressed with its shoulder 18' against the angular inner end of the head and press the same against the part to be secured, and it will be clear that in this manner I have provided a double lock for the cotter pin securely holding the same against loosening of the connection by the vibrations to which the parts are subjected and accidental displacement.

It will be clear that I have disclosed a few forms of my invention only as examples of the many possible ways to practically construct the same, and that I may make such changes in the general arrangement and in the construction of the minor details of my invention as come within the scope of the appended claims without departure from the spirit of my invention and the principles involved.

Having thus described my invention, what I claim as new and desire to secure by Letters Patent is:

1. A cotter pin comprising a body formed from a blank composed of channeled branches bent parallel upon one another, and spaced at one end, said branches having their free ends initially turned inwardly and an angularly-shaped head integrally formed therewith, a shouldered locking pin, pointed ends formed therewith, said pin located in the channel of said branches, one of the pointed ends of said pin engaging the inner faces of said branches at the spaced end thereof to spread the same, and a shoulder at the other end of said pin engaging the inner face of the head when the same is flattened by a hammer blow to securely lock the cotter pin in its adjusted operating position.

2. A cotter pin for locking a nut having its crown provided with a plurality of substantially vertical recesses to form tongues to a bolt, said pin comprising two channeled branches having their free ends initially turned inwardly and bent parallel upon one another and spaced at one end, an angularly shaped head at the opposite end of said pin, and a locking pin having both of its ends pointed adapted to be inserted into the channels of the pin branches and adapted to be passed with said channeled branches through said bolt and through oppositely disposed recesses in the crown of said nut between two adjoining tongues thereof, a shoulder formed with said locking pin near one of its ends, said shoulder to be firmly engaged by the angles of said head when the same is flattened or expanded to engage the cotter pin between two tongues of said nut crown, while the inwardly turned channel branches are spread by the pointed end of said pin at the opposite side of the bolt beyond the recesses in the nut crown to provide a double lock.

FRANZ WASSERBÄCH.